United States Patent Office 3,029,240
Patented Apr. 10, 1962

3,029,240
PREPARATION OF DIMETHYLPIPERAZINE
William E. Erner, Wilmington, Del., assignor to Houdry
Process Corporation, Wilmington, Del., a corporation
of Delaware
No Drawing. Filed July 15, 1959, Ser. No. 827,160
5 Claims. (Cl. 260—268)

This invention relates to the preparation of 1,4 dimethylpiperazine, sometimes designated as N,N-dimethylpiperazine.

Piperazine and its derivatives were of interest primarily to scholars until the recent utilization of such materials as antiparasitic agents. N,N-dimethylpiperazine has been offered for sale recently at about $6.00 per pound, thus stimulating interest in the various conceivable synthetic procedures for manufacturing N,N-dimethylpiperazine. Most proposed syntheses involve methylation of piperazine. However, the cost of piperazine continues to be sufficiently high that there has been a demand for a method of making N,N-dimethylpiperazine from less expensive raw materials.

In accordance with the present invention, dimethylpiperazine is separated from the effluent from a zone in which a methylated tetraethylenepentamine or lower methylated linear member (monomer, dimer or trimer) of the ethylenediamine family is subjected to a silica alumina cracking catalyst at an elevated temperature. Trimethylamine and/or other alkyl amines are recovered as by-products of the process. It is convenient to methylate completely the alkylenepolyamine, but if substantially all nitrogens have at least one methyl group the yield of dimethylpiperazine might still be commercially attractive.

The superior results of the present invention are significant without regard to the theoretical explanation thereof. Only discouraging yields of piperazine have been obtained by catalytic treatment of alkylenepolyamines. In order to account for the attractive yields of dimethylpiperazine, it has been theorized that the initial fragmentation of the linear polyethylenediamine proceeds more readily with the methylated than with the unsubstituted compounds and that the ring closure for the fragments proceeds more readily with the methyl-substituted nitrogens than in an analogous synthesis of unsubstituted piperazine. According to such theories, the 6 membered ring results from the dimerization of ethyleneimine type structures, and such theories assume that N-methylethyleneimine is formed more readily and assume that N-methylimine dimerizes more readily than unsubstituted ethyleneimine. Theories of forming favorable yields of 6 membered rings with minimized linear polymerization by dimerization of 3 membered rings have been criticized by some reaction mechanism scholars, but continue to be of interest to some chemists.

The invention is further clarified by reference to a plurality of examples.

Example I

A sample of triethylenetetramine was methylated by treatment with a mixture of paraformaldehyde and 88% formic acid. Carbon dioxide was evolved by the reduction of the intermediate product, thus following the general pattern of formaldehyde-formate oxidation reduction reactions. The mixture was refluxed until there was no further evolution of carbon dioxide. The crude product was made basic with sodium hydroxide and was fractionally distilled to permit the recovery of hexamethyltriethylenetetramine. This methylation procedure follows the type of reaction disclosed by Pollard JACS 57, 1788 (1935). The reaction can be indicated by the equation:

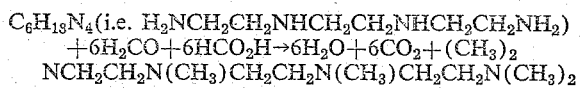

To 294 g. (2 mols) of $C_6H_{18}N_4$ dissolved in 2 liters of technical formic acid, a 33% excess of formaldehyde (528 g. or 16 mols) was added slowly, and the mixture was refluxed for several hours. After neutralization with sodium hydroxide, the reaction mixture was distilled and the residue was vacuum distilled to recover a hexamethyltriethylenetetramine fraction having a density of 0.85 grams per milliliters at 25° and boiling at 174° C. at 50 mm. Hg pressure.

An apparatus suitable for laboratory testing of cracking catalyst was filled with 100 milliliters of cylindrical pellets (approximately ⅛ inch in diameter and ⅛ inch long) of 90 activity silica-alumina cracking catalyst containing 87.4% $SiO_2$ and 12.6% $Al_2O_3$. The reactant gas stream flowed through inert quartz particles prior to and subsequent to the flow through the cracking catalyst particles. The hexamethyltriethylenetetramine was heated to direct the flow of the vapors through the bed of 100 milliliters of cracking catalyst, which was maintained at a temperature of 680° to 690° F. During a period of 170 minutes, a total of 213 grams (0.93 mol) of $C_{12}H_{30}N_4$ (i.e. hexamethyltriethylenetetramine) vapors was passed over the 100 milliliters of cracking catalyst, thus providing a space rate of about 0.9 volume of liquid amine per volume of catalyst per hour. Approximately 0.8 liter of dry gas was formed. A crude liquid was recovered from the effluent from the catalyst chamber, and subjected to two stages of fractional distillation to provide 88.5 g. (0.78 mol) of a technical grade (B.P. 266–272° F.) of dimethylpiperazine, constituting 41.5% of the charge. Most of the losses appeared to be handling losses instead of by-products, there being only 13 g. of residue from the fractional distillation. About 63 g. (1.1 mols) of an alkyl amine fraction designated as trimethylamine was recovered, suggesting a molar ratio of about 1.33 mols of trimethylamine per mol of dimethylpiperazine. It was assumed that this ratio would have been about 0.67 if the products had been more completely recovered. The equation selected to represent the reaction was:

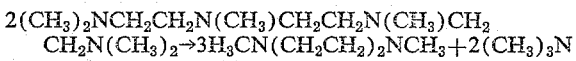

Based upon such equation, the recovery of 88.5 g. of dimethylpiperazine from the once-through treatment of 213 g. of $C_{12}H_{30}N_4$ was 56% of the stoichiometric quantity possible, and this 56% yield was better than the once-through piperazine yields generally resulting from catalytically cracking unmethylated polyethylenepolyamines. For example, only 21% by weight (25.2% of stoichiometric) piperazine was obtained when diethylenetriamine was treated with a silica-alumina (87.5% $SiO_2$, 12.5% $Al_2O_3$ on water free basis) cracking catalyst having a Quinoline Number of about 0.04 at a liquid hourly space velocity of 1 at 625–750° F. Thus the yield of dimethylpiperazine was more than twice what was obtained in a similar preparation of unmethylated piperazine.

Example II

Triethylenetetramine is methylated by treatment with methyl chloride at 100° C. at 15 atmospheres' pressure, followed by treatment with aqueous sodium hydroxide and vacuum distillation of the hexamethyltriethylenetetramine. Vapors of the hexamethyltriethylenetetramine are passed over a silica alumina cracking catalyst having a Cat-A activity of 45, said catalyst being maintained at a temperature of about 695° during the 7 hours' conversion of the amine. The catalyst is not significantly deactivated during the prolonged conversion, as indicated by the recovery of good yields of 1,4-dimethylpiperazine from the effluent from the catalyst during the last hour of operation.

*Example III*

Tetramethylethylenediamine is subjected to the action of silica-alumina catalyst having a Cat-A activity of 45 at an hourly volume space rate of 0.5 volume of liquid reactant per volume of catalyst per hour. The catalyst is maintained at a temperature of 695° F. and the pressure in the catalyst zone is 2 atmospheres. Dimethylpiperazine and trimethylamine are recovered from the liquid product by fractional distillation.

*Example IV*

Pentamethyldiethylenetriamine is vaporized and the vapors are passed through a catalyst bed containing about 50% by volume inert heat retentitive alumina particles and about 50% silica-alumina cracking catalyst having a Cat-A activity of 45. The temperature is maintained at 605° F. and the pressure is adjusted to 0.5 atmosphere while maintaining a space rate of 0.5 liquid volume of reactant per volume of catalyst particles per hour. The ratio of trimethylamine to dimethylpiperazine is slightly less than 1:1 and the dimethylpiperazine is sufficiently pure to obtain a technical grade (266–272° F.) by fractional distillation.

*Example V*

Heptamethyltetraethylenepentamine vapors are passed over a bed of 45 activity silica-alumina cracking catalyst granules at atmospheric pressure at 650° F. at a space rate of about 0.8 volume of amine per volume of catalyst per hour. Trimethylamine and dimethylpiperazine are separated from the liquid products of the reaction by fractional distillation.

By a series of tests, it is established that 1,4-dimethylpiperazine is desirably prepared by remaining within critical limits as follows: the monomer or linear polymer lower than the pentamer (i.e. dimer, trimer or tetramer) of ethylenediamine, or mixtures thereof, is methylated to substitute methyl groups for substantially all of the amino hydrogens; the temperature is above 600° F. and below 700° F.; the pressure is from 0.5 to 2 atmospheres; the hourly liquid volume space rate is from 0.5 to 2; and the catalyst is a silica-alumina cracking catalyst.

Much technical literature concerning silica-alumina cracking catalysts of the last decade has recognized and referred to the "acidity" of such silica-alumina, and such meaning is designated by the "acidity" referred to herein. The Cat-A activity is measured by a method described by Alexander and Shimp, National Petroleum News, August 2, 1944.

*Example VI*

Methyl amine vapors are mixed with an equal volume of vapors of ethylene chloride and passed into a reaction zone to form polymeric materials. After neutralization with aqueous sodium hydroxide, the amines are fractionally distilled to recover a fraction rich in pentamethyltetraethylenepentamine. Treatment of the vapors thereof at 690° F. over an acid treated montmorillonite cracking catalyst at a space rate of 2 liquid volumes per volume of catalyst per hour provides dimethylpiperazine.

Obviously many modifications and variations of the invention as hereinbefore set forth may be made without departing from the spirit and scope thereof, and therefore only such limitations should be imposed as are indicated in the appended claims.

What is claimed is:

1. The method of preparing dimethylpiperazine which includes the steps of: subjecting the vapors of a compound selected from the group consisting of tetramethylethylenediamine, pentamethyldiethylenetriamine, hexamethyltriethylenetetramine and heptamethyltetraethylenepentamine to the catalytic action of acidic silica-alumina particles at a temperature within the range from 600° F. and 700° F. at an absolute pressure within the range of from about 0.5 to 2 atmospheres at a space rate of from about 0.5 to 2 volumes of liquid per volume of catalyst per hour; withdrawing effluent vapors from the catalyst; condensing the vapors from such catalytic action and fractionally distilling the liquid to separate dimethylpiperazine and trimethylamine therefrom.

2. The method of preparing dimethylpiperazine from trimethylenetetramine which includes the steps of: treating triethylenetetramine with methyl halide to form a methylated triethylenetetramine; subjecting such methylated triethylenetetramine to the action of acidic silica-alumina cracking catalyst particles at 600 to 700° F. at a space rate from 0.5 to 2 volumes of liquid methylated triethylenetetramine per volume of catalyst per hour at an absolute pressure within the range from 0.5 to 2 atmospheres, condensing the vapors from such catalytic action and frictionally distilling the liquid to separate dimethylpiperazine from the effluent from the catalyst.

3. The method of preparing dimethylpiperazine which includes the steps of passing a stream of the vapors of a methylated ethylenepolyamine over a silica-alumina cracking catalyst at a rate of from 0.5 to 2 liquid volumes per volume of catalyst per hour at a temperature from 600 to 700° F. at an absolute pressure within the range from 0.5 to 2 atmospheres; withdrawing effluent vapors from the catalyst; cooling such vapors to condense the normally liquid products from such vapors; and subjecting said liquid to fractional distillation to separate dimethylpiperazine.

4. The method of claim 1 in which the triethylenetetramine is methylated by reaction with formaldehyde and formic acid to prepare the hexamethyltriethylenetetramine subjected to the silica alumina particles.

5. The method of preparing dimethylpiperazine which includes the steps of: treating triethylenetetramine with a mixture of paraformaldehyde and formic acid to prepare hexamethyltriethylenetetramine; heating the vapors of hexamethyltriethylenetetramine at a temperature of about 685° F.; subjecting the heated vapors at about atmospheric pressure at an hourly space rate of about 1 volume of liquid per volume of catalyst per hours over silica alumina cracking catalyst to prepare an effluent vapor stream; condensing the liquid product from the effluent from the catalyst; and fractionally distilling the liquid product to recover dimethylpiperazine.

References Cited in the file of this patent

UNITED STATES PATENTS

| | | |
|---|---|---|
| 2,267,686 | Kyrides | Dec. 23, 1941 |
| 2,454,404 | Pfann et al. | Nov. 23, 1948 |
| 2,467,205 | Gresham et al. | Apr. 12, 1949 |
| 2,873,274 | Campbell | Feb. 10, 1959 |
| 2,937,176 | Herrick | May 17, 1960 |

UNITED STATES PATENT OFFICE
CERTIFICATE OF CORRECTION

Patent No. 3,029,240                                April 10, 1962

William E. Erner

It is hereby certified that error appears in the above numbered patent requiring correction and that the said Letters Patent should read as corrected below.

Column 2, line 66, for "atmospheres'" read -- atmospheres --; column 3, line 3, for "hours'" read -- hours --; column 4, line 14, strike out "of"; line 22, for "trimethylenetetramine" read -- triethylenetetramine --; line 31, for "frictionally" read -- fractionally --; line 55, for "hours" read -- hour --.

Signed and sealed this 4th day of December 1962.

(SEAL)
Attest:

ERNEST W. SWIDER
Attesting Officer

DAVID L. LADD
Commissioner of Patents